Figure 1:
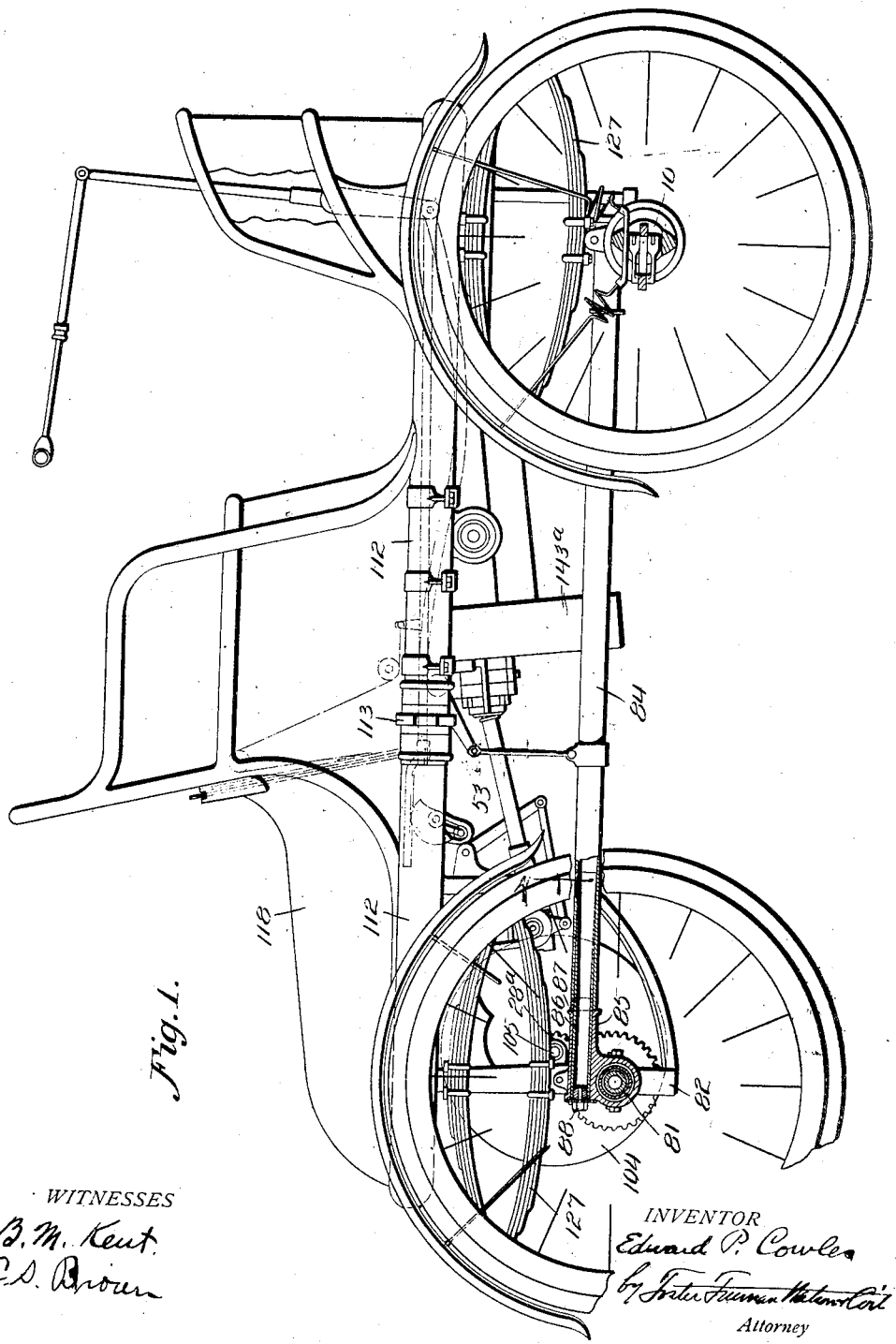

E. P. COWLES.
REAR AXLE STRUCTURE.
APPLICATION FILED AUG. 7, 1912.

1,108,889.

Patented Sept. 1, 1914
4 SHEETS—SHEET 1.

WITNESSES
B. M. Kent
C. S. Brown

INVENTOR
Edward P. Cowles
by Foster Freeman Watson & Co.
Attorney

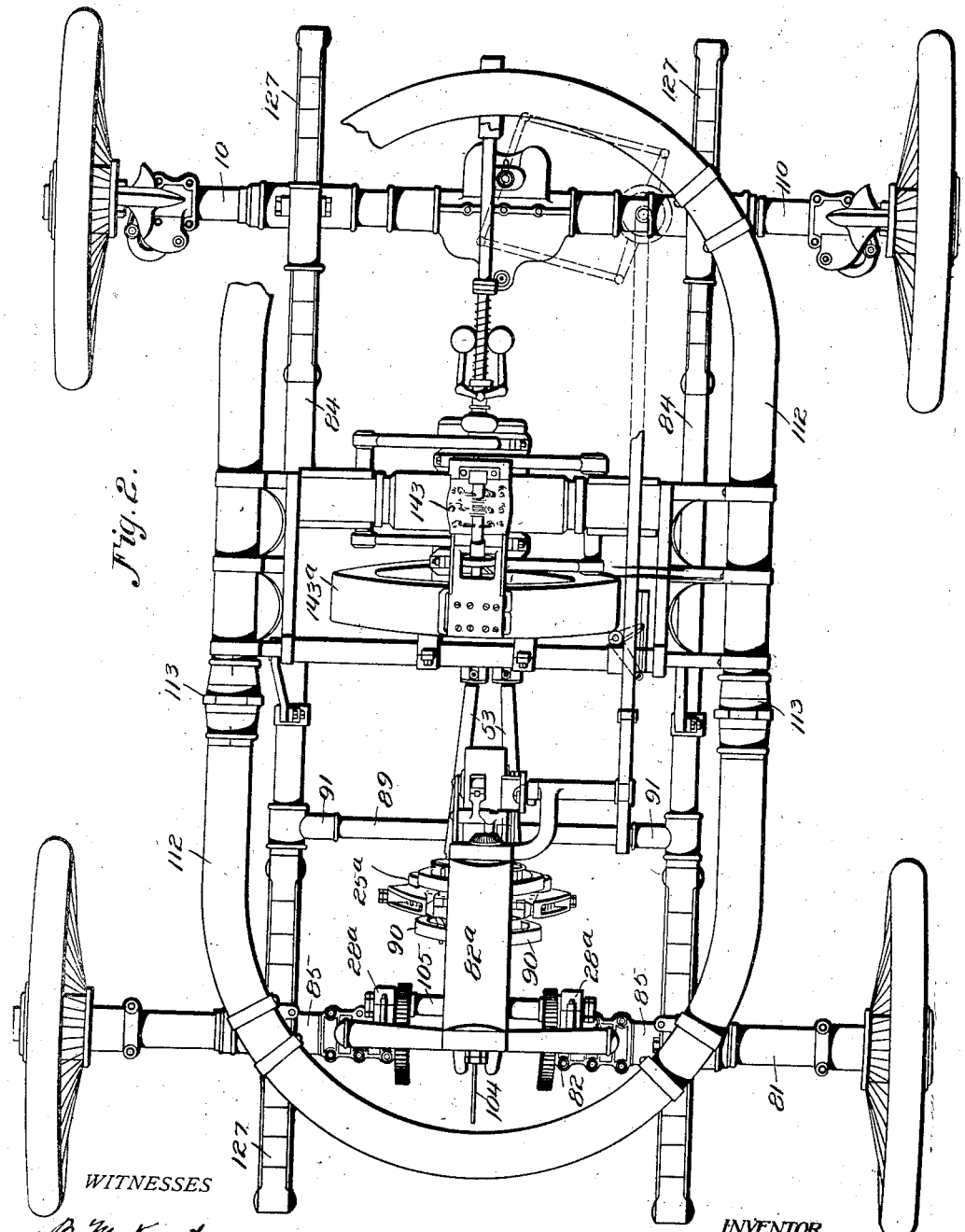

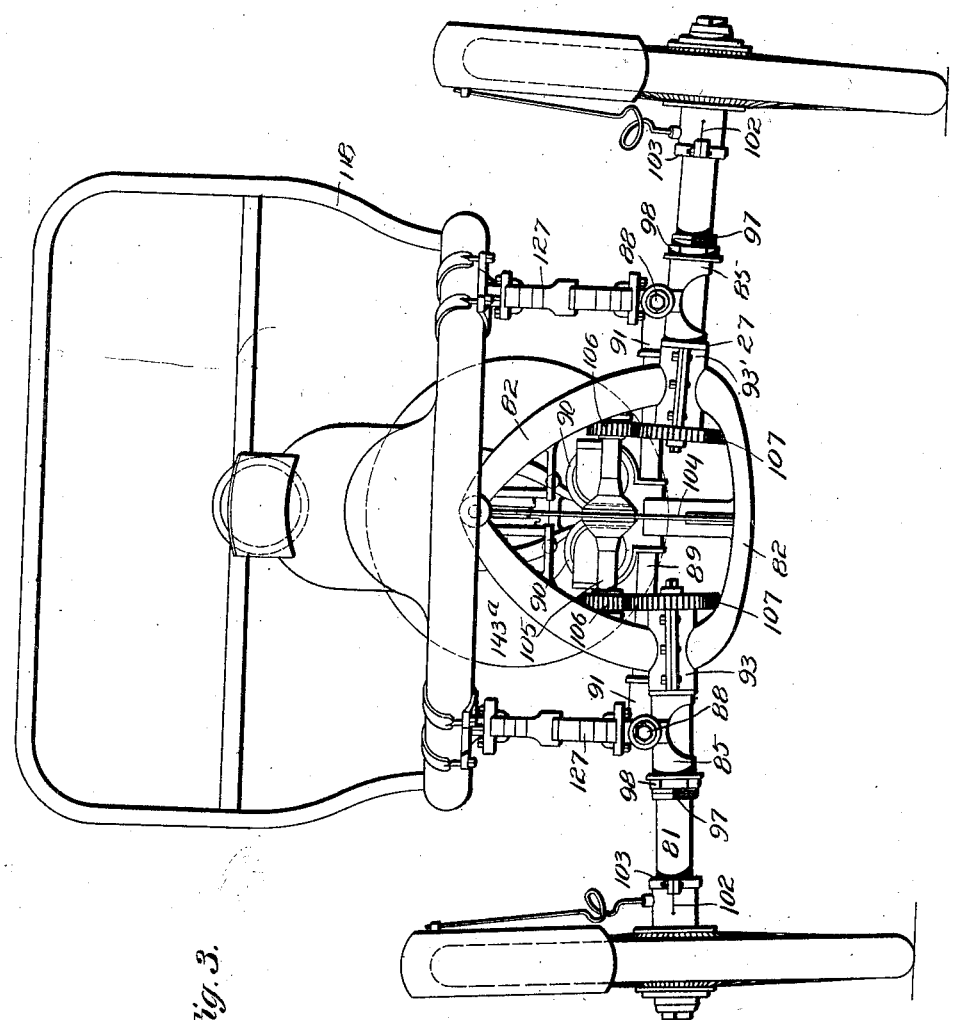

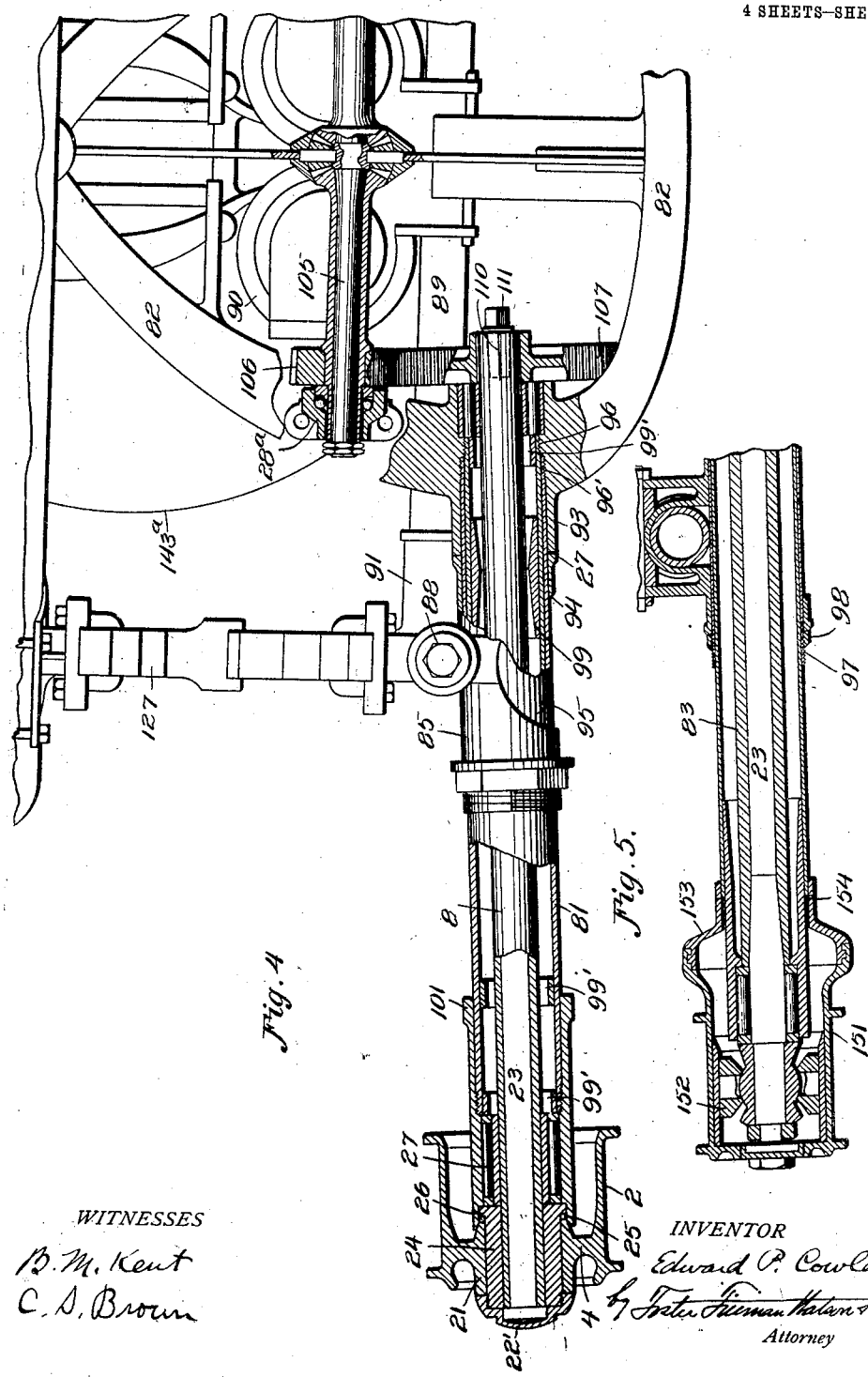

UNITED STATES PATENT OFFICE.

EDWARD P. COWLES, OF SPARTA, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

REAR-AXLE STRUCTURE.

1,108,889.      Specification of Letters Patent.      Patented Sept. 1, 1914.

Original application filed September 6, 1901, Serial No. 74,497. Divided and this application filed August 7, 1912. Serial No. 713,931.

*To all whom it may concern:*

Be it known that I, EDWARD P. COWLES, a citizen of the United States, residing at Sparta, in the county of Kent and State of Michigan, have invented certain new and useful Improvements in Rear-Axle Structures, of which the following is a specification.

This application is a division of my application Serial No. 74,497, filed September 6, 1901.

My present invention relates to improvements in motor vehicles and particularly to the running gear of such vehicles.

One of the objects of the invention is to provide a motor vehicle frame of maximum strength and elasticity and of minimum weight, the various members of which can be assembled without brazing and can be conveniently separated and taken apart.

Another object of the invention is to so construct the driving axle and the driving mechanism that the revolving plane of the driving wheels may "stand out" radially to the curved section of a road bed.

With these and other objects in view, the invention consists in the construction and arrangement of parts described in the following specification, reference being had to the accompanying drawings, in which, Figure 1 is a side elevation of a motor vehicle embodying the invention, parts being in section; Fig. 2 is a plan view of same with body removed and parts broken away; Fig. 3 is a rear view of the vehicle; Fig. 4 is a vertical section through the driving axle and differential mechanism, with other parts of the vehicle shown in elevation; and Fig. 5 is a vertical section through a modified form of driving axle, adapted also for steering.

In the drawings there is illustrated a motor vehicle comprising a suitable body 118 which is supported by springs 127 on the front axle 10 and rear axle 81. These axles are shown as connected by tubular reach bars 84 which reach bars are also connected by a cross bar 89 by T-shaped couplings 91. The connections between the reach bars and the axles are also shown as formed by long bearing T-shaped couplings 85 in which the reach bars and axles are free to turn. Preferably I arrange the member of each of these T-shaped couplings through which the reach bars pass above the member through which the axle passes as shown particularly in Figs. 1 and 3. That part 86 of the reach bars which passes through the couplings 85 is reduced sowewhat leaving a shoulder 87 which bears against the end of the coupling. On the end of the reach bar is a nut and washer 88 which bears against the opposite end of the coupling.

In Figs. 1 and 2 a suitable steering mechanism is illustrated but as this feature is not claimed in this application a specific description thereof is not considered necessary. The patentable features illustrated but not herein claimed are covered by my application Serial No. 74,497 or other divisions thereof.

The body 118 is directly mounted upon a frame 112 which is composed of two U-shaped pieces of tubing with their straight ends joined together as at 113 forming a frame preferably with semi-circular ends and straight sides. The exact form of this frame, however, is immaterial for the purposes of this invention. Also supported on the frame 112 is the motor 143 of any suitable construction but shown as of the internal combustion type with a fly wheel 143$^a$.

The driving gear from the motor to the rear axle is substantially of that form shown and described in my Patent 654,716, dated July 31, 1900. This driving gear consists of a driven disk 104 mounted at the middle of a countershaft 105 which is supported in bearings 28$^a$ on the rear axle yoke 82, hereinafter described. At its middle the shaft 105 is connected by differential gearing 25$^a$ to the disk 104. Engaging frictionally with opposite sides of the disk 104 are two driving gears or friction rollers 90 with their points of contact opposite. These gears or rollers 90 are preferably driven directly from the motor by means of extensible rods 53 connected at both ends by flexible or universal joints which may be of any suitable form. Further description of the details of this driving gear may be found in my said Patent No. 654,716.

The rear axle comprises tubular portions 81 and a central member or yoke 82 which so supports the tubes 81 that their axes are at slight angles to each other giving an "arching" or "cambered" effect.

A forwardly extending portion of the yoke 82ᵃ supports the gears 90 and the mechanism for moving them radially of the disk 104 to get the required variations in speed or leverage, and this part 82ᵃ is supported by the cross bar 89 hereinabove described. This cross bar 89 therefore prevents the yoke 82 from turning under the reaction of the driving gear 90 as will be understood. Said yoke 82, as shown particularly in Fig. 3, is composed of two parts bolted together forming semi-hubs 93, 93', in which the tubular portions 81 of said axle are inserted and securely clamped. These tubes bear the weight and strain of the vehicle through the roller bearings 27 on their outer ends. It is obvious that the strain is greatest at the point 94, where the tubes enter the yoke hubs 93, and if means were not used to strengthen them here all the strain and vibration would concentrate at this point and the metal would soon crystallize and eventually break. To guard against this I reinforce tube 81 by slipping a tube or sleeve 95, the inside diameter of which is large enough to fit closely the outside of the axle tube 81, over the inner end of the latter. This sleeve enters and is clamped in semi-hub 93, with axle tube 81. Both tubes are threaded for about one-half inch on the extreme ends that enter the hub 93, to engage corresponding threads 96, 96' in the semi-hub 93, which prevents the tubes from working out of said hubs or becoming loose therein from the constant jar these parts are subject to. Besides reinforcing tube 81, the tube 95 serves another important purpose. It is extended through the axle member of the T-shaped coupling 85, which bears on the axle 81 just outside of the yoke hub 93, and extends about half way down axle 81, serving as a seat or bearing for the coupling 85, and to protect the axle from the wear of same. Notwithstanding the motion between the couplings 85 and the axles or reach bars is very slight, they keep up a constant chafing thereon, and would eventually wear and weaken them. The tubes 95 project about an inch beyond the outer end of the couplings and this end is made tapering and threaded and has a slit 97, on each side. A nut 98 clamps said end of the tube 95 firmly on axle 81. This nut also serves as a shoulder to retain the coupling 85 in place. Axle tube 81, being thin and subjected to great compression in semi-hub 93, would be liable under great strain, to cockle or compress when it leaves the hub edge 94. To avoid this I reinforce it by arranging a short ring or tube 99 on the inside just under this point and extend it along the axle a short distance to further reinforce the axle at this point. A similar reinforcing ring 99' is arranged at the extreme inner end of the axle tube 81.

The roller race 101 of the rear axle bearing is threaded on the end of the axle as shown in Fig. 4 and reinforcing rings 99' are arranged on the inside of the axle at this point. The inner end of the race 101 is split on each side as at 102 Fig. 3, and firmly clamped to the axle by bolts 103. It will be observed that the tubular axles are held between the outside split-hubs and the inner reinforcing tubes much the same as in a vise, the outside hubs answering for one jaw of the vise and the inside reinforcing rings or tubes for the other.

It will be seen that this feature of a combined clamp and thread joint with reinforcements, is used throughout the construction, and takes the place of the usual brazed joints. They are fully as strong and secure, and have the advantage of being easily and conveniently assembled and taken apart. The metal is not injured by overheating. They are much more elastic. It will be observed that the axles are built up somewhat like a plate spring, and the principle is much the same, distributing the strain and vibration evenly over every part, making them very strong and elastic. Absolute rigidity in a structure subject to constant jar and concussion is objectionable, and this system gives sufficient elasticity to absorb the vibration and also permits of the various parts being made of steel and hardened.

The countershaft 105 has at its outer ends pinions 106 which intermesh with spur gears 107 secured to the inner ends of driving shafts 83, which extend through the tubes 81. By making the faces of gears 107 and pinions 106 slightly conical and cutting the teeth slightly skewing I am able to make the driving axle "arching" so as to make the revolving plane of the driving wheels "stand out" radial with the curved section of a road bed.

Each gear wheel 107 is fitted securely to its shaft 83 in such manner as to be easily removed, and is splined to the shaft to prevent rotation thereon. The end of shaft 83, entering hub of gear wheel 107, is split as at 110, Fig. 4, and provided with an interior tapering thread. A tapering externally threaded plug 111 is secured within this end of the shaft to expand it and hold the gear wheel thereon. By simply unscrewing plug 111 gear wheel 107 can be removed and driving shaft 83 drawn out from the outside, giving free access to roller bearings 27, 27'. Each of these driving shafts 83 is shown as comprising an outer tubular member and an inner solid member or rod 23 and it is mounted in independent bearings 27, 27', adjacent the outer and inner ends respectively of its tube 81. The outer bearing 27, shown as of the roller type, is directly mounted in the piece 10', while the inner bearing 27' is directly mounted in the member 93, hereinabove described. The driving shaft 83 extends beyond the ends of the tubes 81 and each has thereon a spool or bearing member 24 which is suitably keyed to said shaft 83 to turn with it.

The vehicle driving wheels 8, shown as of the wire spoke type, are suitably mounted on the spool 24 so that they may be quickly and easily removed therefrom. The hub 2 of the wheel is formed with a web 4 and a boss 21 which is bored out so as to fit closely over the spool 24 and the boss is provided with a series of teeth 25 that engage corresponding teeth on a shoulder 26 at the inner end of the spool 24 next to the roller bearing 27. A cap nut 22' forces the teeth on the boss 21 into engagement with the shoulder 26 thus retaining the wheel securely on the end of the driving shaft 23.

It will be observed that the roller bearing 27 of the driving axle is extended inside of the hub of the driving wheel well toward the center thereof thereby relieving the driving axle of much strain in carrying the weight of the vehicle. It will also be observed upon reference to Figs. 2, 3 and 4 that the rim of the wheel 8 being arranged approximately midway between the flanges of the hub 2, and the other tubes being slightly arched or cambered, the treads of the wheels at the points of contact with the ground will be approximately vertically in line with the respective bearings 27, thus further relieving the axle 23 of bending strains.

A slightly modified hub is shown in Fig. 5. In this case the wheel is both a driving and a steering wheel and the hub is shown as consisting of a tubular body 151 to which the driving axle 83 or its inner member 23 is attached by a universal joint 152 arranged in the central plane of revolution of the wheel and permitting the latter while receiving the rotating power of the driving axle 83 to oscillate freely in a substantially horizontal plane. The inner end of the tubular body 151 of the hub engages with a sway-block 153, having a horizontal slot 154 sliding on the axle. This holds the wheel rigidly upright while allowing it to oscillate to conform to the direction of the motion of the vehicle. The sway-block 153 is adjusted horizontally to turn the wheel to steer the vehicle by suitable mechanism not shown.

Having described my invention what I claim and desire to secure by Letters Patent is, 1. In a motor vehicle, the combination of a divided tubular axle, a yoke connecting the inner ends of the sections of said axle, driving shafts extending through said sections and alined passages in the yoke, a gear wheel fitted about each of said shafts within the yoke, a removable plug fitted in a socket at the inner end of the shaft and adapted to expand the latter to firmly connect it to the gear wheel, and a countershaft having pinions meshing with said gears.

2. In a motor vehicle, the combination of a divided tubular axle, a yoke connecting the inner ends of the sections of said axle, tubular driving shafts extending through the sections of the axle and having their inner ends projecting beyond the inner faces of the sides of the yoke, said inner ends of the driving shafts being interiorly threaded and divided by a longitudinal slit, a gear fitted on said inner end of each of said shafts, a threaded plug adapted to be screwed into said split and interiorly threaded shaft end to clamp the shaft and gear together, and a countershaft having pinions adapted to drive said gears.

3. In a motor vehicle, the combination of a pair of tubular axle sections, a member connecting said tubular axles so that their axes are at slight angles to each other forming an arch, driving shafts arranged centrally within said axle sections, gears at the inner ends of said shafts, and a horizontally-arranged counter-shaft having gears thereon meshing with the gears upon the driving shaft.

4. In a motor vehicle, the combination with a pair of tubular axle sections, of a member connecting the inner ends of said axle sections, said axle sections being arranged so that their axes are at an angle to each other, driving shafts within said axle sections, differential gearing having driving connection with said shafts and mounted in said connecting member in bearings independent of said shafts, and road wheels directly connected to the outer ends of said driving shafts.

5. In a motor vehicle, the combination with a tubular supporting axle, of a divided driving shaft within the axle, a wheel hub secured to and supported by the shaft and having a hollow spoke bearing member extending inwardly over the tubular end of the axle, and a bearing between said shaft and axle within the hub.

6. In a motor vehicle, the combination with the tubular supporting axle, of a divided driving shaft therein, a bearing for a shaft section on the inside of the end of the axle, and a wheel secured to and supported by said shaft section and having a hub extending inwardly around the tubular axle end and its bearing.

7. In a motor vehicle, the combination with a tubular axle, of a divided driving shaft therein, a differential gearing mounted on bearings independent of said driving shaft and having connection therewith, independent bearings in said tubular axle at the inner and outer ends of each of said driving shaft sections, said shaft sections projecting beyond the ends of said tubular axle, and driving road wheels mounted on the projecting ends of said shaft sections and supporting said tubular axle wholly therethrough.

8. In a motor vehicle, the combination with a tubular axle, of a divided driving shaft therein and projecting beyond the ends thereof, a differential gearing mounted on bearings independent of said driving shaft, a driving connection between said gearing and the sections of said driving shaft, bearings for the inner ends of said sections, bearings in the outer ends of said tubular axle for supporting said driving shaft, and driving road wheels mounted on the projecting ends of said driving shaft and supporting said axle wholly therethrough.

9. In a motor vehicle, the combination with a stationary supporting axle, of a divided driving shaft therein, a differential gearing suitably connecting the sections of said shaft, bearings for the driving shaft at the outer ends of the axle, said driving shaft projecting beyond the ends of the axle, and wheels mounted on and having a driving connection with the projecting ends of said shaft, the rims of the wheels being so constructed and located relative to their hubs, and the wheel axes being so inclined, that the treads of the wheels at the points of contact with the ground are approximately vertically in line with said bearings respectively.

10. In a motor vehicle, the combination with a stationary supporting axle vertically arched, of a divided driving shaft therein, a differential gearing supported by said supporting axle independently of said driving shaft, driving connections between said differential gearing and the sections of said driving shaft permitting said sections to be operated with their axes at slight angles to the axis of said differential gearing, road wheels rotatably mounted at the outer ends of said supporting axle with their revolving planes slightly inclined to the vertical, teeth or projections on the road wheels and similar parts at the ends of the driving shaft sections coöperating therewith, and means for holding said parts in engagement whereby a driving connection is formed between said driving shaft sections and wheels.

11. In a motor vehicle, the combination with a tubular axle, of a divided driving shaft therein, having teeth or projections adjacent its outer ends, means for driving said shaft, road wheels mounted on the driving shaft at the ends of the axle and having parts coöperating with the teeth or projections of the driving shaft, and screw threaded means for retaining said wheels rigidly on said driving shaft.

12. In a motor vehicle, the combination with a pair of tubular axle sections, a member connecting the inner ends of said axle sections, and a roller race secured to the outer end of each axle section, of driving shafts within said axle sections having bearings in said member and in said roller races, a differential gearing connecting said shafts and mounted in bearings in said connecting member independently of said shafts, and road wheels at the outer ends of said shafts.

13. In a motor vehicle, the combination with a tubular axle, of a divided driving shaft therein, bearing members rigidly keyed to the outer ends of said shaft, road wheels having hubs detachably mounted on said bearing members to turn therewith, said hubs having hollow spoke bearing members extending inwardly over the tubular ends of the axle, and supporting bearings at the outer ends of the axle within said hubs.

14. In a motor vehicle, the combination with a tubular supporting axle, of a divided driving shaft therein comprising non-flexible sections, a wheel hub rigidly secured to the outer end of each shaft section and having a hollow spoke bearing member extending inwardly over the tubular end of the axle, and supporting bearings at the outer ends of the axle within said hubs.

15. In a motor vehicle the combination with a tubular supporting axle, of a divided driving shaft therein comprising non-flexible sections, a wheel hub rigidly secured to the outer end of each shaft section and having a hollow spoke bearing member extending inwardly over the tubular end of the axle, and a bearing at each of the outer ends of the axle within said hub for supporting both said hub and the outer end of said shaft section, one through the other.

16. In a motor vehicle, the combination with a supporting axle comprising tubular end parts and a central member, of a differential gearing independently mounted in bearings directly in said central member, wheels at the outer ends of said axle having spoke bearing hubs extending inwardly over the tubular ends of the axle, a sectional driving shaft extending through the tubular parts of the axle and having driving connection with said differential gearing, said shaft having means at its outer ends forming driving connections with said wheels, bearings at the outer ends of the axle within said hubs for supporting both the wheels and the outer ends of the driving shaft, one through the other, and devices removable independently of said bearings for maintaining said latter driving connections.

17. In a motor vehicle, in combination, a tubular supporting axle, driving axle sections therein, differential gearing connecting the inner ends of said sections, wheels at the outer ends of said axle having detachable driving connections with said axle sections and having spoke bearing hubs extending inwardly over the tubular ends of the axle, bearings at the outer ends of the axle within said hubs for supporting both the wheels and the outer ends of the axle sections, one through the other, and devices removably secured to said wheels and independent of said bearings for maintaining said driving connections.

18. In a motor vehicle, in combination, a supporting axle comprising tubular parts, a separately formed gear supporting member secured to the tubular parts at the middle of the axle, and separately formed end pieces fastened to the outer ends of said tubular parts, driving axle sections arranged in the tubular parts, gears including differential gearing connecting the inner ends of said axle sections, bearings in said gear supporting member independent of said axle sections and supporting said differential gearing, wheels at the outer ends of said axle having driving connection with said axle sections, and bearings supported by said end pieces for supporting both the wheels and the outer ends of the axle sections, one through the other.

19. In a motor vehicle, in combination, a supporting axle comprising tubular parts, a separately formed gear supporting member secured to the tubular parts at the middle of the axle, and separately formed end pieces fastened to the outer ends of said tubular parts, driving axle sections arranged in tubular parts, gears including differential gearing connecting the inner ends of said axle sections, bearings in said gear supporting member independent of said axle sections and supporting said differential gearing, wheels mounted upon and having driving connection with the outer ends of said axle sections, and bearings supported by said end pieces for the outer ends of said axle sections and thereby supporting said wheels.

20. In a motor vehicle, in combination, a supporting axle comprising tubular parts, a separately formed gear supporting member secured to the tubular parts at the middle of the axle, and separately formed end pieces fastened to the outer ends of said tubular parts, driving axle sections arranged in the tubular parts, gears including differential gearing connecting the inner ends of said axle sections, bearings in said gear supporting member independent of said axle sections and supporting said differential gearing, wheels at the outer ends of said axle having driving connection with said axle sections and having spoke bearing hubs extending inwardly over the end pieces, and bearings supported by said end pieces within said hubs for supporting both the wheels and the outer ends of the axle sections, one through the other.

In testimony whereof I affix my signature in presence of two witnesses.

EDWARD P. COWLES.

Witnesses:
BERT BEST,
IVAN L. SMITH.